United States Patent
Stern et al.

(10) Patent No.: US 7,558,907 B2
(45) Date of Patent: Jul. 7, 2009

(54) VIRTUAL MEMORY CARD CONTROLLER

(75) Inventors: Julien Stern, Paris (FR); Christophe Carvounas, Le Plessis Trevise (FR); Cedric Colnot, Ivry sur Seine (FR); Nicolas Prawitz, Gif sur Yvette (FR); Jean-Yves Grall, Saint Marc Jaumegarde (FR); Thomas Pornin, Paris (FR)

(73) Assignee: Spansion LLC, Sunnyvale, CA (US)

( * ) Notice: Subject to any disclaimer, the term of this patent is extended or adjusted under 35 U.S.C. 154(b) by 317 days.

(21) Appl. No.: 11/549,551

(22) Filed: Oct. 13, 2006

(65) Prior Publication Data

US 2008/0091878 A1  Apr. 17, 2008

(51) Int. Cl.
G06F 12/00 (2006.01)
G06F 3/06 (2006.01)

(52) U.S. Cl. .................... 711/103; 711/115
(58) Field of Classification Search ............... None
See application file for complete search history.

(56) References Cited

U.S. PATENT DOCUMENTS

| | | |
|---|---|---|
| 5,218,566 A | 6/1993 | Papaliolios |
| 5,341,489 A | 8/1994 | Heiberger et al. |
| 5,684,741 A | 11/1997 | Talreja |
| 5,696,917 A | 12/1997 | Mills et al. |
| 5,732,017 A | 3/1998 | Schumann et al. |
| 5,754,475 A | 5/1998 | Bill et al. |
| 5,818,759 A | 10/1998 | Kobayashi |
| 5,898,618 A | 4/1999 | Lakkapragada et al. |
| 6,011,725 A | 1/2000 | Eitan |
| 6,026,465 A | 2/2000 | Mills et al. |
| 6,040,994 A | 3/2000 | Naura |
| 6,185,128 B1 | 2/2001 | Chen et al. |
| 6,195,288 B1 | 2/2001 | Fujio et al. |
| 6,260,156 B1 | 7/2001 | Garvin et al. |
| 6,275,961 B1 | 8/2001 | Roohparvar |
| 6,327,194 B1 | 12/2001 | Kurihara et al. |
| 6,344,994 B1 | 2/2002 | Hamilton et al. |
| 6,356,863 B1 * | 3/2002 | Sayle ......................... 703/27 |
| 6,411,549 B1 | 6/2002 | Pathak et al. |
| 6,466,480 B2 | 10/2002 | Pekny |
| 6,477,090 B2 | 11/2002 | Yamaki et al. |
| 2002/0061658 A1 | 5/2002 | Verhaar et al. |
| 2002/0133312 A1 | 9/2002 | Peterson et al. |
| 2005/0044330 A1 * | 2/2005 | Elazar et al. ............... 711/154 |

FOREIGN PATENT DOCUMENTS

WO    WO 2005/013133 A2 *  2/2005

* cited by examiner

*Primary Examiner*—Kevin Verbrugge
(74) *Attorney, Agent, or Firm*—Turocy & Watson, LLP (57) ABSTRACT

The claimed subject matter can provide an architecture that can transparently provide more robust interactions between a host device and a smartcard or other mass media storage device by way of block level read or write operations provided as part of a standard interface protocol. A virtual controller can be installed on the smartcard to manage access to the data store of a smartcard. The virtual controller can provide special objects (e.g., files, directories, partitions . . . ) to the host, and upon an access to one of these special files, call an application to manage pre- or post-processing of the data transferred between the host and the smartcard.

41 Claims, 8 Drawing Sheets

VIRTUAL MEMORY CARD CONTROLLER

CROSS-REFERENCE TO RELATED APPLICATIONS

This application is related to U.S. Pat. No. 6,799,256, entitled "SYSTEM AND METHOD FOR MULTI-BIT FLASH READS USING DUAL DYNAMIC REFERENCES" filed on May 1, 2002, and to U.S. Pat. No. 7,103,706, entitled "METHOD FOR MULTI-BIT FLASH READS USING DUAL DYNAMIC REFERENCES", filed on Sep. 3, 2004, both of which claim priority to U.S. Provisional Application Ser. No. 60/372,361, filed Apr. 12, 2002, entitled "METHOD FOR MULTI-BIT FLASH READS USING DUAL DYNAMIC REFERENCES." The entireties of these applications are incorporated herein by reference for all purposes.

TECHNICAL FIELD

The claimed subject matter relates generally to the field of high-density mass media storage devices such as smartcards or other mass storage devices that can interface a host device by means of a standard interface.

BACKGROUND

As use of and demand for consumer communication devices increases, advancements in size, performance and functionality are constantly being developed and improved. For example, many consumer devices such as content players, cellular phones, or the like employ a mass media storage device to house a wide variety of data. Generally, the host device can connect to the mass media storage device by way of a standard interface such as MultiMediaCard (MMC), Secure Digital (SD), Universal Serial Bus (USB), etc., and data can be transmitted according to one of these protocols.

Accordingly, applications running on the host can write data to the mass storage device as well as read data from the mass storage device, but commands that are more complex are often unavailable. One reason that can be so is that the MMC (or SD, USB, etc.) protocol, upon which much current hardware and software is based, was designed to efficiently transfer data between a host device and a mass storage device, so operations other than read and write are typically limited. Another reason is that since most mass storage device typically have flash memory configured as a block device, the hierarchical file system view available to the host (or applications running thereon) is not available to a controller or Central Processing Unit (CPU) on the mass storage device. Rather, the mass storage device CPU is only apprised of the type of operation (e.g., read or write) and the sector number.

Accordingly, attempts to utilize the more sophisticated command set of memory card controllers such as Subscriber Identity Module (SIM) cards or other smartcards with a mass storage device have been limited.

SUMMARY

The following presents a simplified summary of the various embodiments in order to provide a basic understanding of some aspects presented herein. This summary is not an extensive overview of the various embodiments. It is intended to neither identify key or critical elements nor delineate the scope of the embodiments. Its sole purpose is to present some concepts in a simplified form as a prelude to the more detailed description that is presented later.

According to the subject matter disclosed and claimed herein, in one aspect thereof, comprises an architecture that can transparently facilitate more robust interactions between a host and a mass storage device over a standard interface and employing standard operations such as a read or a write at a sector level. The claimed subject matter can employ a Virtual Memory Card Controller (VMCC) to manage access for any mass storage device that does not otherwise possess an integrated file server. The mass storage device (e.g., MultiMediaCard (MMC), Secure Digital (SD) card, Universal Serial Bus (USB) key, disk drive . . . ) can be seen as a block device whose file system is handled by the host device such as a cellular pone, a Personal Digital Assistant (PDA), Personal Computer (PC), etc.

In accordance with one aspect of the claimed subject matter, the VMCC can employ standard read and write operations at the sector level in order to obtain a bi-directional communication channel between applications running on the host and applications running within a Central Processing Unit (CPU) of the mass storage system. In accordance therewith, arbitrary pre-processing and/or post-processing can be performed on a file prior to writing and/or after reading, and in a transparent way from the point of view of host or host applications.

In accordance with one aspect, the VMCC facilitates triggering smartcard (or other mass storage device) applications by the host through an existing protocol (e.g., MMC, SD, USB . . . ) without modification to any hardware or implementing new commands. Thus, the added features can be directly supported by any host operating system without altering the file manager. According to one principle of the claimed subject matter, a communication socket can be opened by accesses to one or more special files. These special files can be created with a fixed size, typically one sector long (usually 512 bytes). The special files can be physically extant on the data store and can be statically written at the formatting stage of the mass storage device. Additionally or alternatively, the special files can exist virtually without a physical counterpart on the data store. In the latter case, the special files can be addressable as logical extensions of the data store following the last physical sector of memory. Each special file can open a socket, and each socket can trigger a specific application in the smartcard. Data written to the socket associated with a special file will not necessarily be transferred to the memory of the data store. Rather, the data can be processed by the mass storage device application. Data read from the socket associated with a special file can output the processing result obtained by an application on the mass storage device.

In accordance with one aspect of the claimed subject matter, the VMCC can create an independent bi-directional communication channel over the standard protocol. In accordance therewith, only two sockets need be created, one to intercept input and one to intercept output commands to and from the VMCC. It is to be appreciated that the 512-byte (or other sector size format) sector size of the interface protocol need no longer be related to the sector size of the data store. Rather, it can be used to transfer a command with a particular format, such as according to the following: Device number/Socket number/Payload. It is to be understood that the foregoing format is merely exemplary and is not intended to be limiting. Many other formats could be employed and are considered to be within the scope and spirit of the claimed subject matter.

In accordance with still another aspect, the VMCC can utilize one of the socket implementations described supra to fully implement an International Organization for Standardization (ISO) 7816 protocol. While it is readily apparent that given the aforementioned features, this aspect represents a small technical step, but can result in a major functional improvement over conventional devices. For example, implementing an ISO protocol can allow encapsulating ISO commands, or creating a new set of ISO+ commands, over existing interfaces. Moreover, this feature need not require a custom implementation on the host file manager, or any other changes.

In accordance with yet another aspect of the claimed subject matter, the VMCC can add to the previous aspects described herein a supporting File Allocation Table (FAT) (or another type of file system) client, which can, e.g., allow parsing the supporting FAT. The supporting FAT client may not be a full file system as, in many situations, it cannot modify the FAT in order to avoid memory corruption, e.g., due to common caching mechanisms employed by the host. Thus, the host application can indicate to the VMCC which file should be processed. In accordance therewith, the VMCC can act as a filter. For example, writing data to the input socket can facilitate pre-processing of that data prior to transfer to the data store. Likewise, reading data from the output socket can result in post-processing the data read from the data store before it is delivered to the host.

According to a further aspect, the VMCC can provide for securing access to the data store as previously, but in this case without affecting the host applications in any manner. For example, any existing application, without code modification, can access securely to the files stored in the data store, and those files can be secured independently from the host applications. Essentially, the VMCC can integrate a fully functional file system (e.g., a pseudo-FAT) with a real FAT (or other file system) that is extant on the data store. In accordance therewith, the real FAT can be virtually extended (e.g., size multiplied by n) to create several accesses to the same physical files through an application filter. The pseudo-FAT (or FAT mirroring) can then be presented to the host, which perceives the data store is n times larger than the actual real size. Any host application can have n ways to access any given file; wherein each of the n ways can trigger a different treatment on the data of the file. It is to be understood that the real FAT and pseudo-FAT can be formatted according to different file systems protocols.

In accordance with another aspect of the claimed subject matter, the VMCC can to the previous aspects a partition system, for instance two partitions, one with the real FAT, one with the pseudo-FAT. In accordance with this aspect, the files physically residing on the data store can, therefore, be accessed directly by a secure application through the real FAT, e.g., in a supervisor mode, whereas the files can be accessed by any host application, e.g., in a standard user mode.

The following description and the annexed drawings set forth in detail certain illustrative aspects of the disclosed embodiments. These aspects are indicative, however, of but a few of the various ways in which the principles of the embodiments may be employed and the subject disclosure is intended to include all such aspects and their equivalents. Other advantages and novel features will become apparent from the following detailed description when considered in conjunction with the drawings.

DETAILED DESCRIPTION

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the embodiments may be practiced without these specific details. In other instances, well-known structures and devices are shown in block diagram form in order to facilitate describing the embodiments.

As used in this application, the terms "component," "module," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or"

rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

As used herein, the words "transparent" or "transparently" when used in connection with an interface to a host can refer to interaction in a manner that does not disturb normal interaction between the host and a mass storage device. In addition, these terms can mean that the host is unaware of the existence of certain extended capabilities and/or that no modification of the host or applications thereon is required in order to utilize the features described herein.

Figure 1:
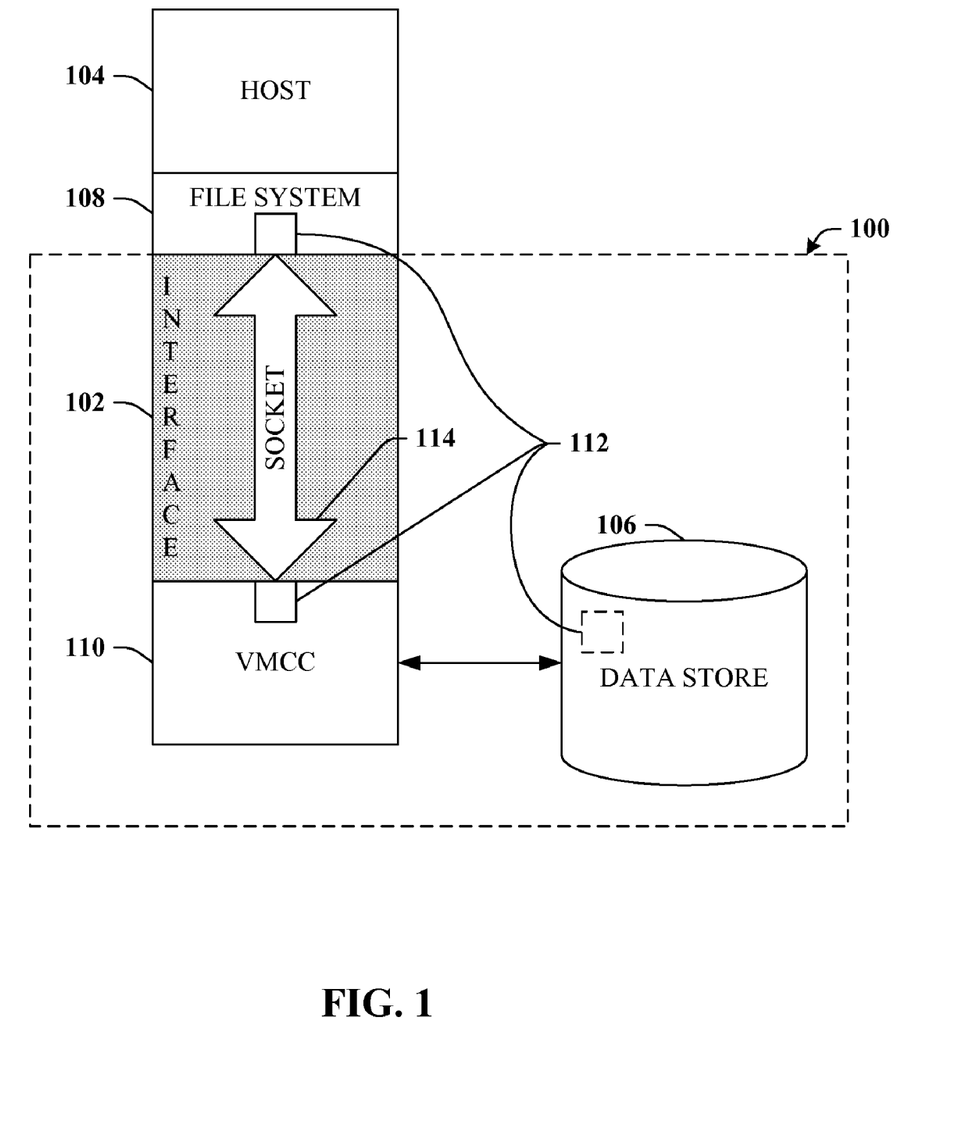
FIG. 1 illustrates a system that can transparently employ standard read or write operations at a sector level to facilitate more robust interaction between a host and a mass storage block device.

With reference now to the drawings, FIG. 1 illustrates a system 100 that can transparently employ standard read or write operations at a sector level to facilitate more robust interaction between a host and a mass storage block device. Generally, the system 100 can include an interface 102 to a host 104. The interface 102 can conform to a standard protocol for communicating with a data store 106 such as Multi-MediaCard (MMC), Secure Digital (SD), Universal Serial Bus (USB), or the like. The host 104 can be, e.g., an electronic device with a processor such as a cellular phone, a Personal Digital Assistant (PDA), a digital camera, an organizer, a digital recorder, an MP3 (MPEG-1 Audio Layer-3) player, a pager, an electronic toy or game, a scanner/reader, a Personal Computer (PC), a laptop, or substantially any device capable of running a host application (not shown) and interfacing (e.g., by way of interface 102) with a mass storage device such as system 100 and/or data store 106.

In accordance therewith, system 100 can be, e.g., a smartcard such as a Subscriber Identity Module (SIM) card, a Universal Subscriber Identity Module (USIM) card, a Universal Integrated Circuit Card (UICC), or similar device. In addition, the system 100 can be another type of mass storage device such as a Universal Serial Bus (USB) key drive, a disk drive or substantially any storage device in which the host 104 relies upon a host file system 108 in order to access data in the data store 106. The file system 108 can be configured according to a File Allocation Table (FAT) such as FAT12, FAT16, FAT32, VFAT, etc., or some other scheme such as New Technology File System (NTFS), Hierarchical File System (HFS) and HFS Plus, ext2 (second extended file system), ext3 (third extended file system), International Organization for Standardization (ISO) 9660, (On-Disk Structure) ODS-5, or Universal Disk Format (UDF), and can, e.g., present to the host 104 a hierarchical view of the data in the data store 106

In accordance with one aspect, the data store 106 can be configured as a block device, wherein the data is addressable at a sector level such as by sector, typically 512 bytes in length. The data store 106 can be comprised of flash memory, and the data store 106 can include a Flash Translation Layer (FTL) that can, e.g., manage bad blocks and "wear" of the flash while providing a simple logical sector interface to a higher level file system such as file system 108. For example, if an MP3 file is stored on the data store 106 beginning at sector 12345, then the file system 108 can present a hierarchical path view "\music\song.mp3". Access to this path can be translated by the file system 108 to route an appropriate operation (e.g., a read or a write) to sector 12345 of the data store 106.

For the sake of explanation and not limitation, conventional mass storage devices (e.g., a card/chip) such as an MMC, typically include physical mass storage (e.g., data store 106), usually in the form of flash memory. In addition, an MMC can include an MMC interface (e.g., interface 102) and a Central Processing Unit (CPU) or controller (not shown) to manage communication between the host 104 and the mass media storage. Generally, the functionality available is limited to simple read operations or write operations. Accordingly, applications running on the host can write data to the mass storage as well as read data from the mass storage, but commands that are more complex are often unavailable for two reasons. First, the MMC (or SD, USB, etc.) protocol, upon which much current hardware and software is based, was designed to efficiently transfer data between a host device and a mass media storage device, so operations other than read and write are limited. Second, since most mass media storage devices are block devices, the hierarchical file system view available to the host 104 (or applications running thereon) is not available to the MMC CPU. Rather, the MMC CPU is only apprised of the type of operation (e.g., read or write) and the sector number. That is, if the host 104 desires to retrieve "\music\song.mp3" for, say, a music player application running on the host, the MMC CPU witnesses a sector level read of sector 12345, but otherwise is unaware that this sector maps to the path "\music\song.mp3" apparent from the files system 108 to host 104 applications.

In order to mitigate these difficulties, the system 100 can also include a Virtual Memory Card Controller (VMCC) 110. Typically, the VMCC 110 will be a software application that runs on the MMC CPU (not shown). In accordance with another aspect, the VMCC 110 can be a hardware circuit operatively coupled to the MMC CPU. In another aspect, the VMCC 110 can entirely supplant the MMC CPU. While an MMC provides one concrete example of the limitations of conventional mass media storage devices, it is to be appreciated that these difficulties exist for virtually any storage device that does not include an integrated file server, regardless of the communication interface and protocol employed. Accordingly, while for the sake of convenience, this example (and others herein) is provided in the context of an MMC device, it is to be appreciated that the claimed subject matter can work equally as well with other devices, systems, protocols, standards, etc. For example, the VMCC 110 could run on (or replace or be coupled to) a USB drive controller, an SD controller, etc.

The VMCC 110 can control access to the data store 106 and, as well, can be configured to advertise a special object 112 to the file system 108 employed by the host 104. The special object 112 can be a special file, a special directory, a special partition, a special file system, or another abstract data type relating to file system hierarchy, any of which can be referred to herein as element 112 and as will be detailed more fully, infra. In accordance with one aspect, the special object 112 is a special file 112. Generally, the special file 112 will be exactly one sector in length (e.g., 512 bytes), however, that need not always be the case. Furthermore, the special file 112 can physically reside on the data store 106 in which case advertising the special file 112 to the host file system 108 is substantially similar to any other file or data residing on the data store 106.

It is to be understood that the special file 112 presented to the file system 108 need not have a physical counterpart in the data store 106. Rather, the special file 112 can be a virtual file addressable to the file system 108 as a dynamic extension to the data store 106. For example, regardless of the size of the data store 106, the memory can be ordered in consecutive sectors from 0 to N−1, where N is the total number of physical sectors in the data store 106. Accordingly, the VMCC 110 can present the special file 112 to the file system 108 as though it were a normal file physically residing on the data store 106 at sector N. Moreover, although only one special file 112 is depicted, it is to be appreciated that there can be numerous special files (or objects) 112. Any or all of the special files (or objects) 112 can be physically extant on the data store 106 or dynamic extensions that, e.g., logically extends the size of the data store 106 and can be addressed by the file system 108 as sectors N or greater.

Data contained in the special files 112 is generally irrelevant. Rather, the special files 112 can serve as "triggers" for applications that can run on the MMC CPU (or VMCC 110) to provide a richer set of interactions with the host 104 and/or applications running thereon. For example, the VMCC 110 can open a bi-directional communication channel (e.g., socket 114) between the host 104 (or application running thereon) and the MMC CPU or VMCC 110 (or application running thereon). As detailed supra, the VMCC 110 can control access to the data store 106. In addition, the VMCC 110 can be configured to receive an operation (e.g., a read operation, a write operation, etc.) directed to the special file 112, and in response call one or more applications (not shown) to handle the requested operation. More discussion relating to the application and the socket 114 can be found with reference to FIGS. 2, 4, and 5, but it should be appreciated that attempts to access the special file 112 do not generally lead to a corresponding read from or write to the special file 112. Rather, even if the special file 112 is physically present on the data store 106, no actual access to that file need result (although it could). Instead, the application triggered by an operation associated with the special file 112 can control what data is sent to or retrieved from the host 104.

In the case in which the special file 112 is physically extant in the data store 106, the special file 112 can be created as the data store 106 is formatted. Accordingly, the special file 112 will appear to the file system 108 like any other file on the data store 106. Since the VMCC 110 typically does not have access to the host file system 108, any operation, such as a read operation, relating to one of the special files 112 will be seen as a low level sector address. For example, special file 112 might be labeled "random" appearing to the host 104 according to the path "\special\random". However, if the special file 112 is located at, say, sector 98765 on the data store 106 (or is allocated that sector by the VMCC 110 as a logical extension of the data store 106), the VMCC 110 should be capable of associating or assigning sector 98765 to special file 112, "random". This should be so, even though this information is not typically passed on by the file system 108. The special file (or object) 112 is detailed more thoroughly with reference to FIG. 3.

Figure 2:
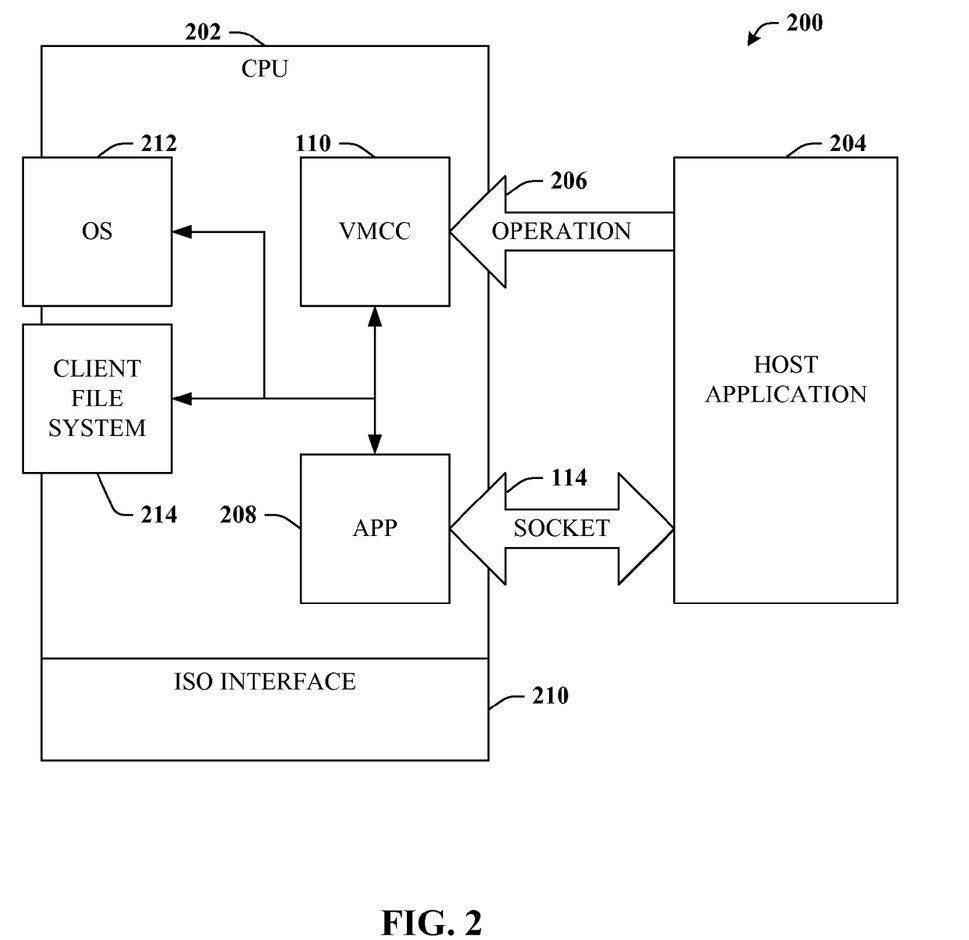
FIG. 2 depicts an exemplary system that can facilitate a bi-directional communication channel or socket between applications that reside on a host and a client, respectively.

While still referencing FIG. 1, but turning also to FIG. 2, a system 200 that can facilitate a bi-directional communication channel between applications that reside on a host and a client, respectively, is depicted. In general, the system 200 can include the VMCC 110 that can reside in a memory card CPU/controller 202 for a smartcard and can control access to a data store 106. The memory card controller 202 can be a SIM subsystem that is compliant with ISO 7816 and/or European Telecommunications Standards Institute (ETSI) 102.221. However, it is to be appreciated that the controller could also be packaged with a USIM or UICC and comply with other standards accordingly. As well, the controller could be implemented for devices other than smartcards.

Regardless of the implementation details, the controller can have a dedicated ISO interface 210, an operating system 212 and a client file system 214. In accordance therewith, a host application 204 (e.g., an application running on the host 104) can be presented a view of all the data on the data store 106 according to the host file system's 108 format. Any operation 206 (e.g., a read/write) on that data can result in an appropriate read from or write to the data store 106 starting at the corresponding sector of the data store 106.

In addition, the VMCC 110 can advertise or publish a special file 112 to the host file system 108. Borrowing from the above example for the sake of consistent illustration and not limitation, the special file 112 can be a one sector file named "random", presented by the file system 108 at the path "\special\random" and addressable (whether or not physically extant on a data store 106) at sector 98765. Thus, the host application 204 can "read" the special file 112 labeled "random" by way of read operation 206. In accordance with one aspect, from the perspective of the host application 204, the read operation 206 is addressed to the path "\special\random". The VMCC 110 can receive the read operation 206 as a read operation 206 of sector 98765.

As previously described, the VMCC 110 can assign or earmark sector 98765 to a special file 112 (in this case the "random" special file 112). Thus, the VMCC 110 can be apprised of the fact that the host application 204 intends to read a special file 112 rather than other (e.g., non-special) information included in the data store 106. Hence, the VMCC 110 can distinguish between conventional reads (or writes, etc.) and special reads (or writes, etc.) even though the host application 204 need not be aware of the difference. In particular, normal operations can be forwarded to the data store 106. However, an operation, such as read operation 206 on a special file such as special file 112 can invoke an application 208 rather than going to the data store 106.

For example, the VMCC 110 can consult a lookup table or the like that associates a read operation 206 of sector 98765 with a particular application 208, and then call that application 208 to run on the memory card controller 202. The application 208 can be a "random" application specifically associated with the "random" special file 112 that, e.g., generates a random number. As depicted, the "random" application 208 can take over communication with the host application 204 by way of socket 114. As such, the "random" application 208 can return the data generated directly to the host application 204. Although not depicted, in accordance with another aspect, the socket 114 can exist between the VMCC 110 and the host application 204 (or host 104), and the application 208 can route the data back to the VMCC 110 for dissemination to the host application 204. The host application 204 need not be aware of the foregoing abstraction. For some intents and purposes, the host application 204 may see no difference between obtaining the data from a special purpose application (e.g., "random" application 208) and retrieving the data from the data store 106 as though such data actually existed in the file at the path "\special\random".

It is to be appreciated and understood that the application 208 can be particularly suited to individual purposes. For example, while it might be appropriate to obtain random data such as, e.g., when the host application 204 requires it for, say, an encryption key, a write operation 206 may not be appropriate. In that case, a write operation 206 to the special file 112 could simply be dropped and/or ignored by the VMCC 110. It is readily apparent, however, that such need not be the case. For example, in one aspect, the VMCC 110 may call a different application 208 depending upon whether the operation 206 is a read or a write, e.g., a "random-w" application 208. In other situations, the "random" application 208 may be equipped to handle any type of operation 206 (e.g., by invoking a different set of routines based upon the type of operation 206).

Of particular note is that operation 206 can be distinguished based upon both the type of operation 206 (read, write, etc.) as well as the special object 112 upon which the operation 206 is associated or to be performed. Either of these constructs can be employed by the VMCC 110 to determine which (if any) application(s) 208 to call. As described, supra, the VMCC 110 can maintain a lookup table in order to determine the appropriate application 208 to call, or make this determination in another manner, as detailed in connection with FIG. 3.

Figure 3:
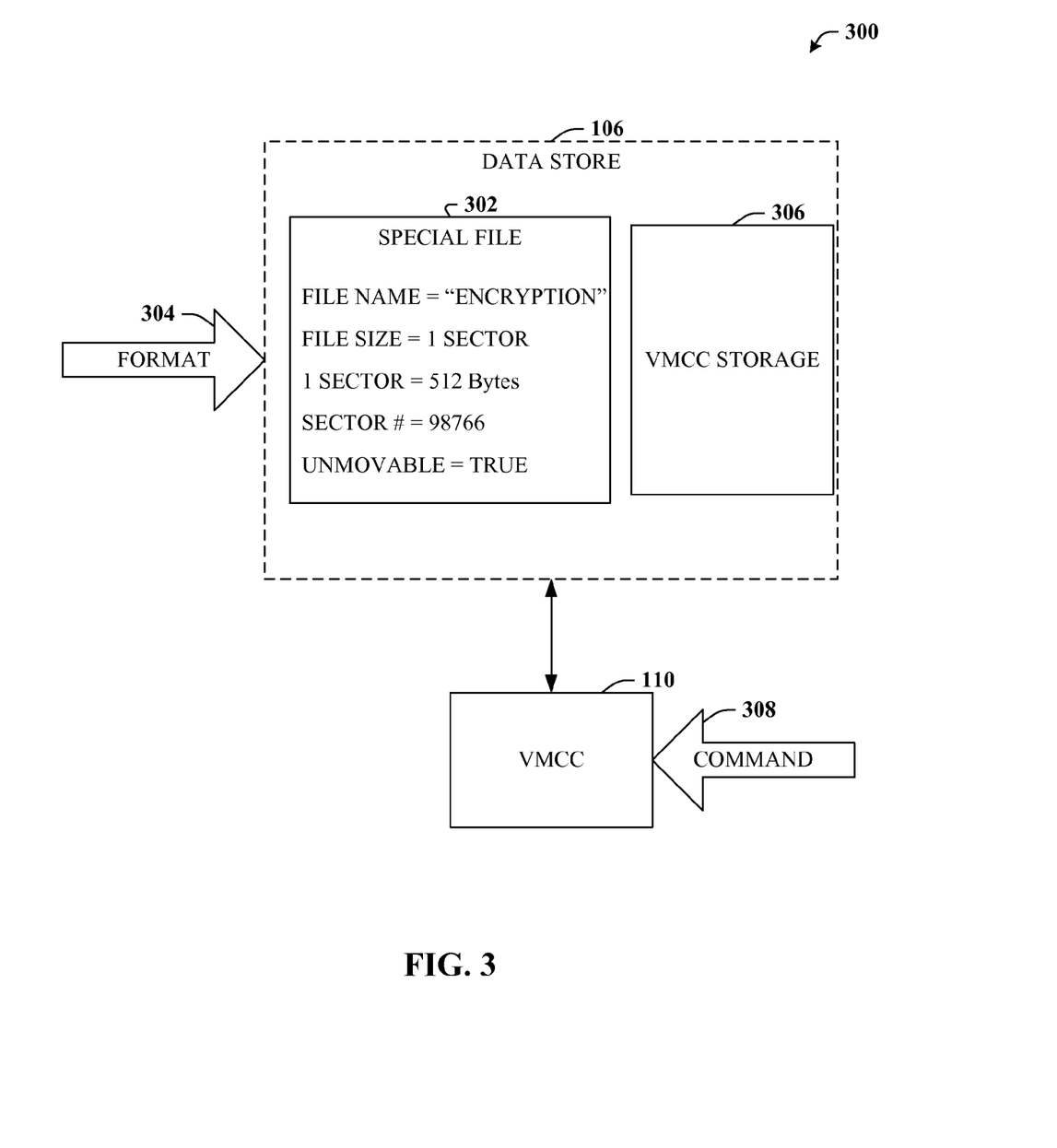
FIG. 3 is a block diagram that depicts a system that can facilitate creation and maintenance of special objects.

Turning now to FIG. 3, a system 300 that can facilitate creation and maintenance of special objects is illustrated. In accordance with one aspect, the special object is a special file 302 that physically resides on the data store 106. In this case, the file name is "encryption", however, it is to be appreciated that many special files 302 could exist in addition to or alternatively. As with the special file "random" described supra, special file 302 typically has a file size of one sector or 512 bytes, however it should be understood that some file systems may employ sector blocks of varying size (e.g., 1024 bytes, etc.). As well, special file 302 can be associated with a different application. That is, an operation with regard to special file 302 can indicate to the VMCC 110 to invoke an application labeled, say, "encryption" apart from the "random" applications called with respect to the "random" special file detailed above.

Here, special file 302 physically resides on the data store 106 at a logical sector number of 98766 and is flagged unmovable. Since the VMCC 110 typically tracks the sector of each and every special file 302 (e.g., in order to recognize when it is appropriate to call an application to handle communication with a host), flagging the special file as unmovable simplifies this procedure. While certain file systems are equipped to provide an option to make particular sectors and/or files unmovable, others do not provide such a feature. In the latter case, and in light of the fact host applications such as defragmentation or other storage optimization utilities and the like are prone to rearrange the data on the data store 106, the VMCC 110 should be equipped to track the current location of any or all of the special files 302.

Accordingly, the VMCC 110 can record the logical sector address of the special file 302 as soon (or shortly thereafter) as the special file 302 is created. Generally, the special file 302 is created when the data store 106 is formatted, e.g., by format command 304, and persists on the data store 106 thereafter. Should the special file 302 move (for whatever reason), the VMCC 110 can track this change and update the logical sector that corresponds to the new location of the special file 302. For example, the VMCC 110 can analyze accesses to the abstract data types (e.g., directories) that point to or encapsulate the special file 302. Hence, ideally, the special file(s) 302 will persist on the data store 106 (e.g., always be present), will usually be one sector in length, and cannot be deleted or moved. However, if such does occur, the VMCC 110 can rebuild the special file 302 and/or update the new location for the special file 302.

To the accomplishment of the foregoing, the VMCC 110 can maintain a VMCC storage area 306 on the data store 106. The VMCC storage area 306 can include, e.g., data tables and/or lookup tables that map special files 302 to corresponding logical sector addresses of the data store 106. The VMCC storage area 306 can also include a template file with a version number of all the special files 302 that should exist for the current version (e.g., in case one is deleted and requires rebuilding or to dynamically create new special files 302 . . . ). Furthermore, the VMCC storage area 306 can include other storage needs as well, such as object code for applications (e.g., code for applications 208 from FIG. 2) or the like. It is to be appreciated that the VMCC storage area 306 need not be addressable/visible on the host side.

In accordance with one aspect of the claimed subject matter, the VMCC 110 can be configured to detect the logical location of special files 302. For example, rather than (or in addition to) persistently tracking the location of the special files 302, the VMCC 110 can, e.g., upon initialization, scan a given set of directories (e.g., the "/special/" directory as well as others) for files with a file size of exactly one sector. For instance, the VMCC 110 can receive a command 308 to load into memory. Upon loading, or starting, the VMCC 110 can explore the special directories and flag the special files 302. The VMCC 110 endowed with this feature may require additional memory, but can be particularly well suited to dynamically creating special files 302 on the fly rather than employing only a static set of special files 302 generated when the data store 106 is formatted. Moreover, newly created special files 302 can even occur as a result of an operation received from a host application, such as an update utility or the like that, e.g., performs a write operation on a special file 302 associated with the path "\special\newobject".

As discusses supra, the special file 302 need not in all cases correspond to a file that is physically extant on the data store 106. In accordance with one aspect, the special file 302 can be a virtual file that is addressable, e.g., at sectors beyond the range of physical sectors of the data store 106. The VMCC can maintain this extended portion by employing the VMCC storage area 306. It is also to be appreciated that although the special file 302 has been described in the context of a file, it could exist as well (whether physically extant on the data store 106 or virtual logical extensions) as other abstract data types/structures such as special directories, special partitions, special file systems, etc.

Figure 4:
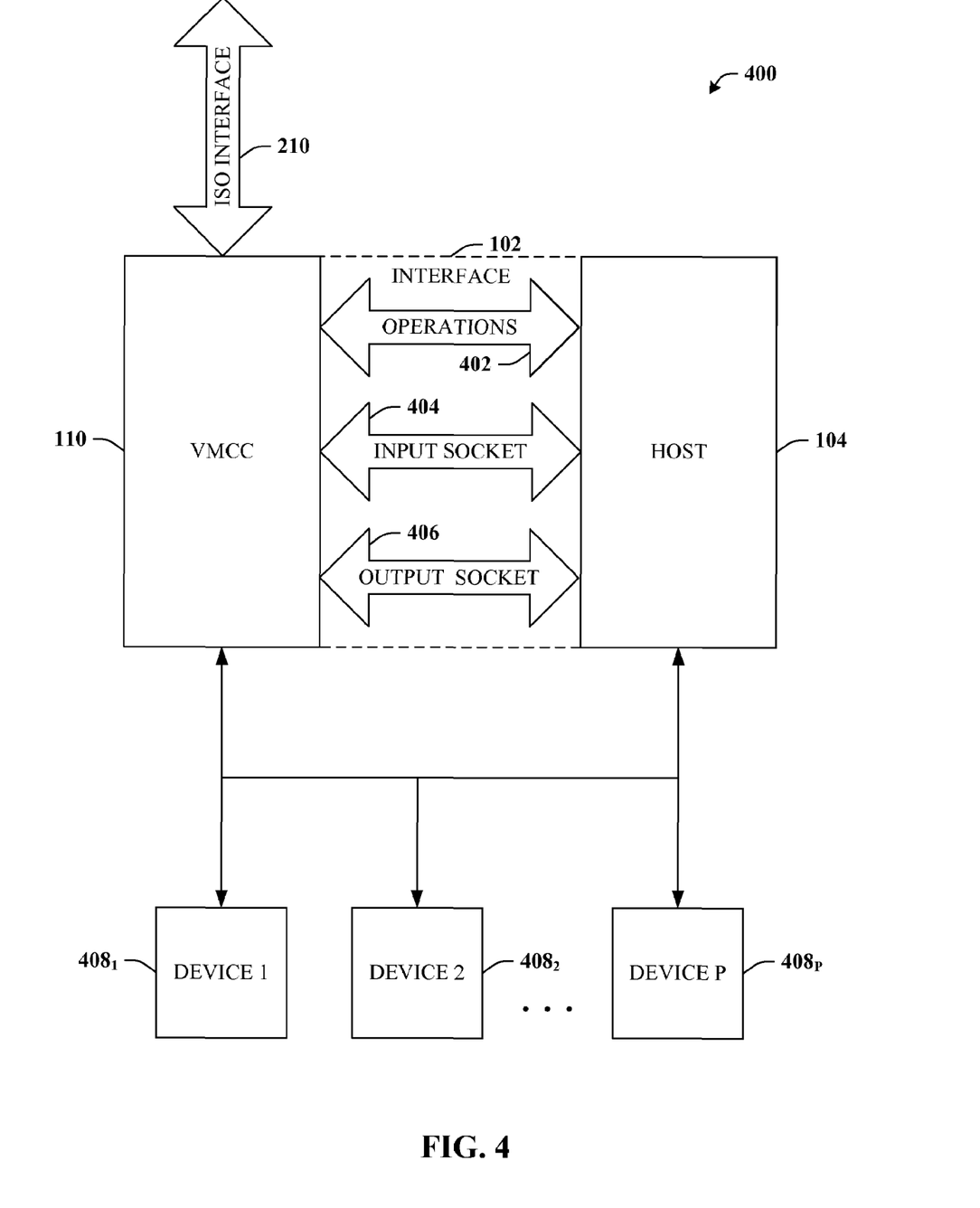
FIG. 4 illustrates a system that transfer commands by way of a standard interface.

Turning now to FIG. 4, a system 400 that transfer commands by way of a standard interface 102 is depicted. In general, the system 400 can include the VMCC 110 that interfaces to the host 104. As detailed previously, the VMCC 110 can reside on a controller within a smartcard (not shown) or upon another type of controller (not shown), with the ISO interface 210. Operations 402 can be transmitted between the host 104 and the VMCC 110 as substantially described supra in connection with the operation 206 of FIG. 2. For example, the operations 402 can be read operations or write operations in accordance with the protocol implemented by the interface 102 (e.g., MMC or the like).

In accordance with one aspect of the claimed subject matter, upon receipt of a write operation 402 (and/or a path directed to a special object, such as "in", for example), the VMCC 110 can open an input socket 404. Likewise, upon receipt of a read operation and/or a path directed to a special object labeled, e.g., "out", the VMCC 110 can generate an output socket 406. While for the sake of simplicity, only two sockets (e.g., 404 and 406) are illustrated, other embodiments can exist with virtually any number of sockets that can provide communication channels between the VMCC 110 and the host 104 (or applications running thereon).

According to one aspect, the sockets 404, 406 can be employed to transmit commands of a particular format. For example, the command could be a packet formatted with a device number, a socket number and a payload. The device number can be configured to correspond to devices $408_1$-$408_P$, referred to herein either individually or collectively as devices 408. The socket number can be organized to designate one of the sockets (e.g., sockets 404, 406, etc.). The payload can represent, e.g., the number of bytes that is to be directed to the given device number over the given socket number. It should be understood that the command format described is merely one example, and many other formats could be employed without departing from the scope and spirit of the claimed subject matter.

In accordance with yet another aspect, the VMCC 110 can provide a full implementation of ISO protocol by way of one or more of the sockets 404, 406. For example, the input socket 404 can be instantiated by way of an operation 402 on a special object such as "in" or "/iso/in", etc. Similarly, the output socket 406 can be created based upon a special file similarly labeled as "out" or "/iso/out", etc. The communication channel provided by the sockets 404, 406 over the interface 102 can be employed to encapsulate ISO commands such as ISO 7816-3, 7816-4 (e.g., Application Protocol Data Unit (APDU) commands) in one embodiment. Other ISO commands are, of course available and applicable, and can depend upon the type of interface 102, the type or applications running on the host 104, or the like.

In addition, a new set of ISO commands could be transmitted in a similar way. That is, a command from virtually any command set can be encapsulated within one of the sockets 404, 406 and transmitted along the interface 102. As such, an ISO command (or virtually any command type) can be received by the VMCC 110 and forwarded along the ISO interface 210 (or another appropriate channel). In accordance with one aspect, a pair of special files, e.g., "\special\in" and "\special\out" can be employed. For example, data can be written from the host 104 by way of the \special\in socket (e.g., socket 104) and read from the data store by way of \special\out, including a polling mechanism. For instance, a special flag in the block read from \special\out could indicate that there is no data available for reading, or conversely that there is more data available for reading (e.g., that a subsequent read operation will provide more data). These primitives allow for the implementation of a generic asynchronous bi-directional communication channel, extremely similar to so-called sockets in the TCP/IP world.

Figure 5:
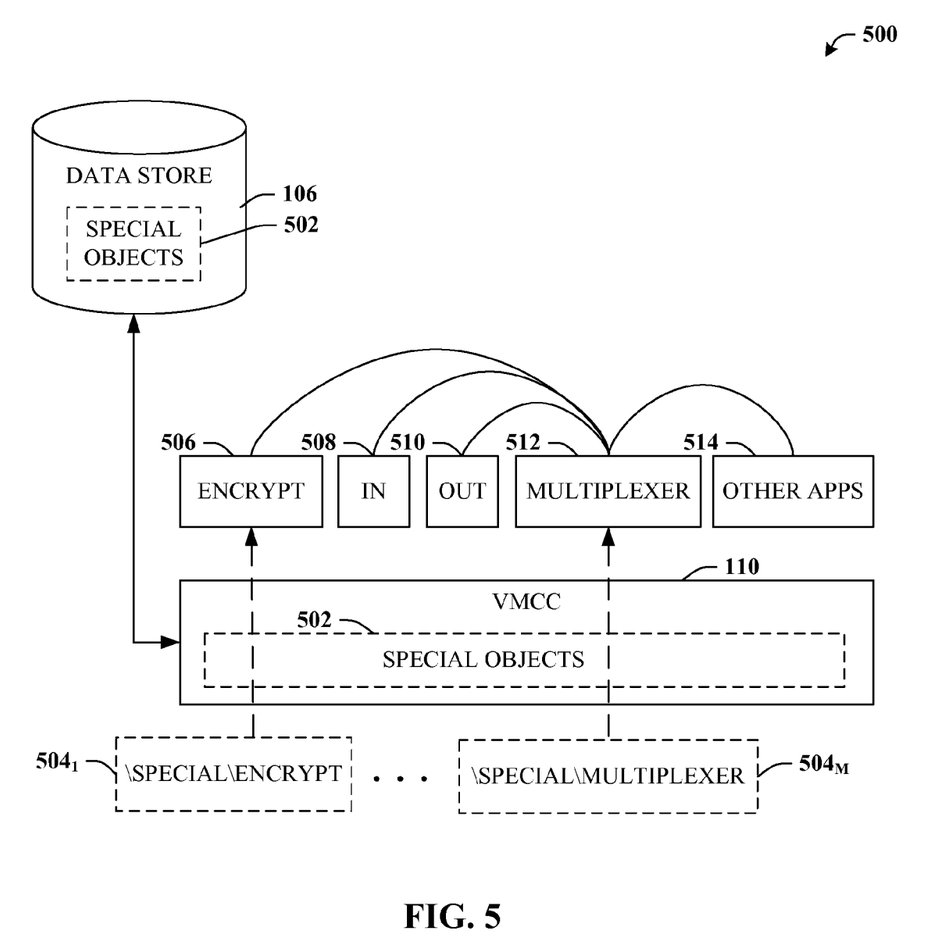
FIG. 5 is an exemplary system that can call various applications in response to operations relating to special objects.

With reference now to FIG. 5, a system 500 that can call various applications in response to operations relating to special objects 502 is illustrated. Generally, the system 500 can include the VMCC 110 in which a set of special objects 502 are advertised to a file system (not shown) on a host device (not shown). As depicted, the special objects 502 can be physically extant on the data store 106, but this need not be the case, as the special objects 502 can also be virtual objects. The host device or an application running thereon, can address the special objects 502 by way of the associated paths ($504_1$-$504_M$). It is to be appreciated that although only two paths are depicted, there could be virtually any number, M, paths, each associated with one or more special objects 502. Hence, the file system paths $504_1$-$504_M$ can be referred to herein either individually or collectively as paths 504.

In accordance with one aspect of the claimed subject matter, the VMCC 110 can provide access to a wide range of applications (e.g., applications 506-514). Each of these applications 506-514 can be associated with one or more particular special objects 502, which upon addressing any of these special objects 502 can open a communication socket between the associated application 506-514 (and/or the VMCC 110) and the host device or application running thereon. For example, a special object 502 (e.g., a special file labeled, "encryption") can be presented to the file system located at the path 504 "\special\encryption". An operation (e.g., read/write) involving this path can be received by the VMCC 110 and directed to a "encryption" application 506. The encryption application 506 can be configured, e.g., such that a read operation can return an encrypted version of a previous write operation.

In a similar manner, the VMCC 110 can invoke an in application 508, an out application 510 or any number of other applications 514 (e.g., a random application that calculates a random number, etc.). In addition, the VMCC 110 can call a multiplexer application 512, for instance based upon an operation relating to the path $504_M$ "\special\multiplexer". According to one aspect the multiplexer application 512 can accept commands in a specific application-defined format, and these commands can be written to another special object 502 or a storage area (e.g., VMCC storage area 306 of FIG. 3). Hence, the data packets of the command can be written to a special object/file 502, which can contain the identity of the calling application, the identity of the receiving application and an internal application specific payload. The main receiving application (e.g., multiplexer application 512) can forward read and write command payloads to one or more other receiving applications (e.g., applications 506, 508, 510, 514) based on the identity of the receiving applications.

Figure 6:
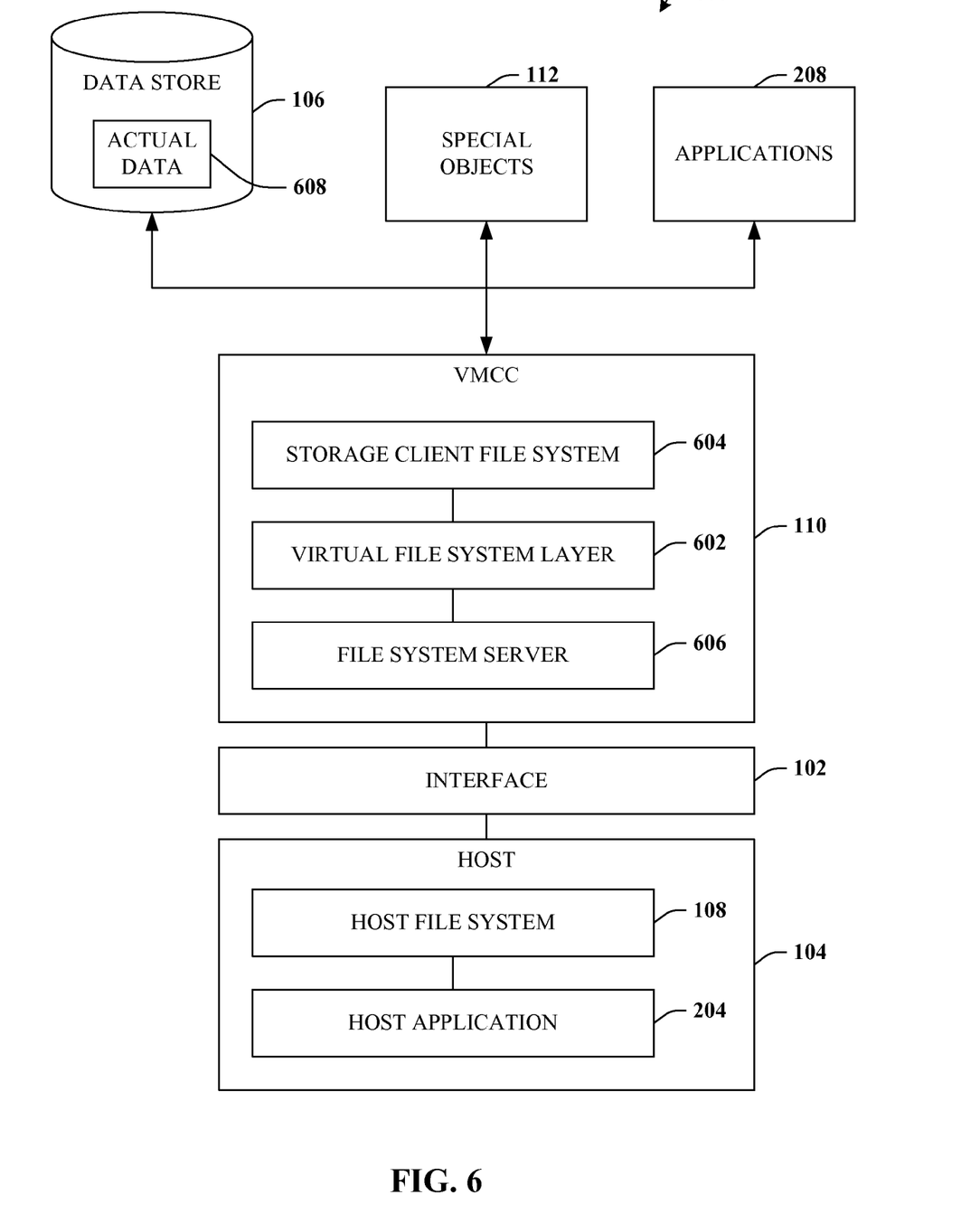
FIG. 6 is an exemplary system that can advertise a virtual file system over a standard interface.

Turning now to FIG. 6, system 600 that can advertise a virtual file system over a standard interface 102 is illustrated. Broadly, the system 600 can include the interface 102 to the host 104 by which standard operations can be communicated to the VMCC 110 in accordance with the interface 102 protocol (e.g., MMC or the like). As detailed supra, the host 104 can include the host file system 108 as well as host applications 204 that, e.g., seek to reference the data store 106. The data store 106 can be, e.g., a flash memory disk and can comprise an FTL. The VMCC 110 can intercept operations directed toward special objects 112 (e.g., special files 112) and invoke applications 208 rather than directing the operation to the data store 106, as substantially described above.

In addition, in accordance with one aspect, the VMCC 110 can include virtual file system 602 that can, for example, provide a layer of abstraction between a file system (e.g., storage client file system 604) used to actually read/write data to the data store 106 and a file system (e.g., host file system 108) apparent from the host 104. In essence, the virtual file system 602 is a pseudo file system that does not necessarily correspond to actual data 608 on the data store 106. However, by employing a virtual file system 602, the VMCC 110 can provide features in addition to those already described supra. Moreover, it is to be understood that the virtual file system 602 need not be the same type as host file system 108.

In accordance with one aspect of the claimed subject matter, the VMCC 110 can also include a storage client file system 604 that can read an write actual data 608 at designated locations (e.g., sectors) in the data store 106. The VMCC 110 can also include a file system server 606 that can publish the virtual file system 602 to the host 104. In accordance therewith, the virtual file system 602 can run on top of the storage client file system 604 and be presented to the host 104 (or applications running thereon) by way of the interface 102, which can be, as previously detailed a sector-based interface.

It is to be appreciated and understood that by providing a virtual file system 602, any file-based operations can be approached in a manner that is entirely transparent to the host 104. While many of the foregoing aspects of the claimed subject matter can be implemented to provide dedicated communication channels between host applications 204 and applications 208 that, e.g., run on a controller associated with the VMCC 110, in some cases it is still necessary that the host 104 be apprised of certain information in advance. For example, the host 104 might need to be aware of the format of the data to be transmitted by way of the channel/socket. In other cases, the host 104 might be required to be aware of the "service" provided by a given special object/file 112 (e.g., the application 208 that is invoked).

In order to mitigate some or all of the aforementioned difficulties, the VMCC 110 can employ certain special objects 112 in the form of special directories 112. It should be understood that these special directories could be special partitions (not shown) or special file systems (not shown) as well. Each of the special directories 112 can be associated with the application 208, which will be detailed more fully infra. In addition, some or all of the actual data 608 (e.g., actual files physically stored) in the data store 106 can be associated and/or linked to any of the special directories 112 (including subdirectories 112). That is, even though only one copy of the actual data 608 might physically exist on the data store 106 (visible to the host 104 under, e.g., the root directory "\") the entire set (or a subset) of actual data 608 might be visible to the host 104 under each of the special directories 112 as well.

Hence, read or write operations to the actual data 608 by way of the root directory can result in appropriate blocks of data passed to or from the host 104 just as would normally occur when accessing the data store 106. In addition, read or write operations to the actual data 608 by way of one of the special directories 112 can result in appropriate blocks of data passing through an associated application 208 (and potentially being modified in some way) after the data is retrieved from the data store 106 or before the data is written to the data store 106. In essence, the virtual file system 602 in the VMCC 110 can represent to the host 104 that various special directories 112 are extant on the data store 106. The virtual file system 602 can also represent to the host 104 that all (or a subset) of the actual data 608 is included in each of these special directories 112. Access to a file in any of the special directories 112 can result in additional pre- or post-processing (e.g., processing according to the associated application 208), whereas access to the same file by way a path that does not include one of the special directories would not invoke the additional pre- or post-processing.

In accordance with one aspect of the claimed subject matter, the VMCC 110 can provide a Digital Rights Management (DRM) toolkit within the local smartcard or other mass storage card/chip/device within which the VMCC 110 resides. It should be appreciated that a DRM toolkit is merely exemplary and only one of the possible uses of one or more of the foregoing aspects. In accordance therewith, a digitally protected and/or encrypted file can be written to the data store 106 by a host application 204. This protected file, say, "song.mp3" can appear as actual data 608 and can also appear, e.g., in a special directory 112, labeled, say, "\drm\", even though the protected file does not actually reside in the \drm directory on the data store 106. Nevertheless, the virtual file system 602 can advertise to the host 104 that the special files are included in the \drm special directory 112, e.g., at a path of "\drm\g.mp3".

Should the same (or any other) host application 204 attempt to read from \drm\song.mp3, the VMCC 110 can invoke the application 208 associated with the \drm special directory 112, in this case a "\drm" application 208. The drm application 208 can determine whether an associated user has rights to obtain the content of song.mp3. If the user does have rights to obtain the content, the drm application 208 can, for instance, compute a decryption key for the song.mp3 file and transmit the appropriate decrypted blocks of the protected file as they are queried by the host application 204.

It has to be underscored that such a system is very robust because it need not require any advanced knowledge on the part of the host 104 or the calling application 204. Virtually any music player application (e.g., host application 204) can access a DRM protected song (as long as rights to do so are extant) without any modification to its codebase by simply opening and reading a song in the \drm special directory 112. Similarly, as another example, any video player could access a DRM protected movie without any modification to its codebase by simply opening and reading a movie in the \drm special directory 112. More broadly, the claimed subject matter can be employed to instantiate a robust set of pre- and/or post-processing applications 208 to any type of data that can be communicated between the host 104 and the data store 106, and do so in a manner that is transparent to the host 104. In accordance with the instant aspect, accesses to both special files 112 or special directories 112 can be redirected (recursively or not) to one or several of the applications 208

Figure 7:
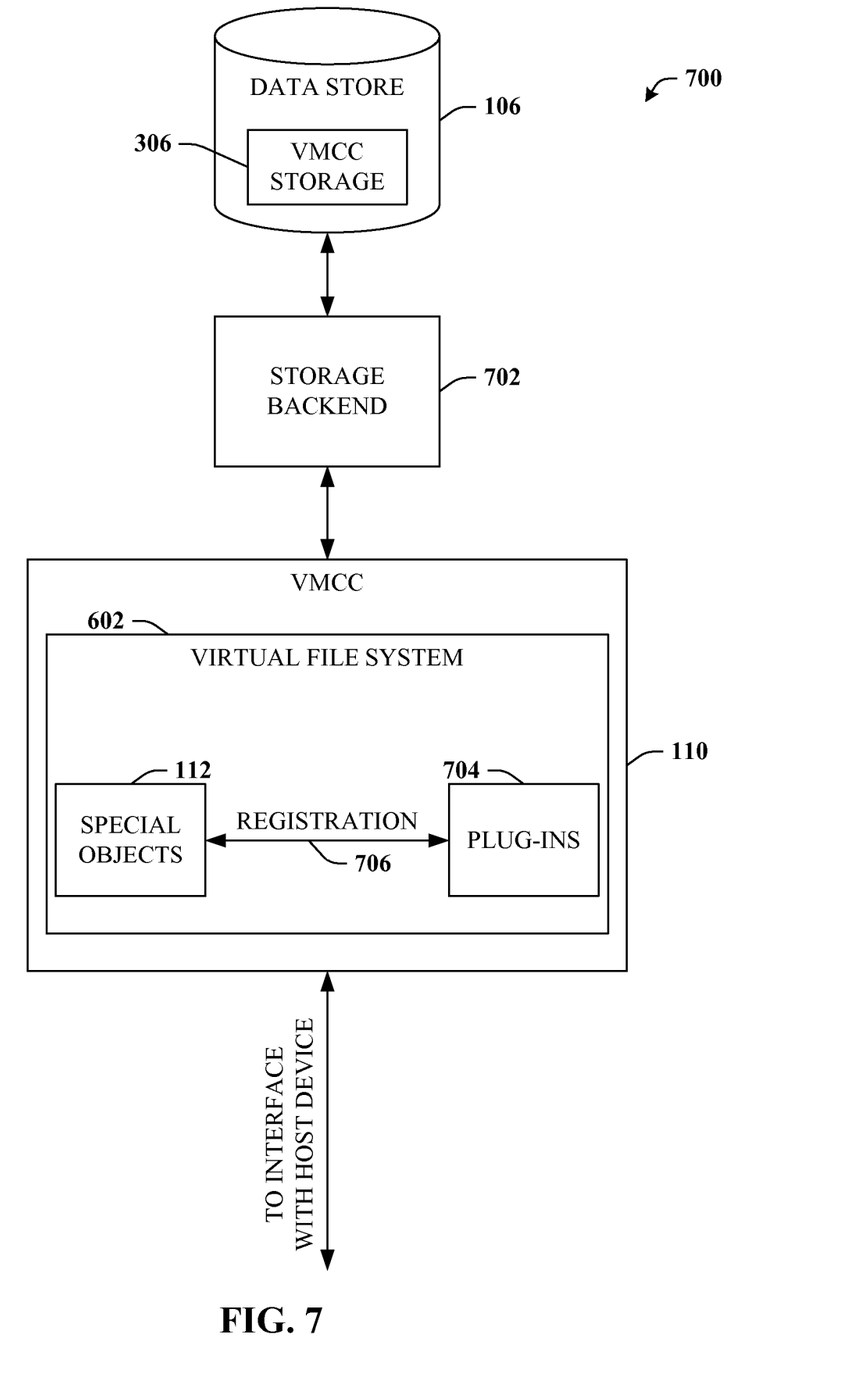
FIG. 7 is an exemplary system that can transparently extend a pseudo file system with registered plug-ins.

With reference now to FIG. 7, an exemplary system 700 that can transparently extend a pseudo file system with registered plug-ins is depicted. Generally, the system 700 can include the data store 106 with a VMCC storage area 306 for use with the VMCC 110. As previously described, the VMCC storage area 306 need not be visible and/or addressable outside the VMCC 110. The VMCC 110 can communicate with the data store 106 (as well as the VMCC storage area 306) by way of a storage backend 702. The storage backend 702 can facilitate all the low-level disk accesses to the data store 106. While the storage backend 702 can also include an hierarchical file system, this need not be the case. Rather, the storage backend 702 can employ mechanisms other than hierarchical files with directories, subdirectories, and/or other abstract data types in order to store to and retrieve from the data store 106.

The VMCC 110 can include the virtual file system 602 that can, e.g., supply a pseudo-view of the data on the data store 106 as detailed supra with reference to FIG. 6. In addition, the virtual file system 602 can itself be extended by way of various plug-ins 704, which are described in more detail below. The VMCC 110 can present the virtual file system 602 (e.g., a pseudo-view of the data on the data store 106) to devices attached to the interface. Accordingly, the file system view presented will conform to the protocol expected by the interface (e.g., MMC, USB, SD, or the like). To the accomplishment of the foregoing, the VMCC 110 can be configured to receive operations such as reads and writes at the sector level. Therefore, the VMCC 110 can map these sector-level operations to logical paths in the virtual file system 602, based upon a table stored in the VMCC storage area 306.

As a concrete example, but in no way intended to be limiting, the VMCC 110 can determine (e.g., based upon the data table) that an access to sector, say, 23456 corresponds to a logical path named, say, "\some\specific\path". Based upon this logic path, the VMCC 110 can the information included with the operation that facilitated the access to an appropriate plug-in 704. For example, the VMCC 110 can forward the information to a plug-in 704 that has registered itself as being authoritative over a special directory 112 such as the "\some" directory (e.g., paths that begin with \some, as is the case with the present example). Thus, the VMCC 110 can call the particular plug-in 704 similar to what was described previously in connection with the application 208. After invoking the \some plug-in 704, the VMCC 110 can request the particular file, which in this case is \specific\path and forward it to the \some plug-in 704 along with other information such as the file offset, etc.

It is to be appreciated that the VMCC 110 need not be responsible for actively populating the paths associated with various plug-ins 704. Rather, the VMCC 110 can query the plug-ins 704 to determine which paths the individual plug-ins 704 have declared themselves to beauthoritative, e.g., by way of registration 706 upon those paths/special objects 112. Additionally or alternatively, the VMCC 110 can receive an unsolicited registration 706 message from one of the plug-ins 704 indicating which special objects 112 (e.g., special directories, special files, and/or the paths associated therewith) over which the particular plug-in 704 has authority. The VMCC 110 can record and track this information in order to instantiate the proper plug-in 704 upon receipt of an access to a special object 112 that is associated therewith.

In accordance with the foregoing, it should be appreciated and understood that conventional direct access to files on the data store 106 can also be handle by way of a plug-in 704. For example, an access to actual data on the data store 106 that does not implicate a special object 112 can still be routed to a plug-in, for example a noop plug-in 704. According to one aspect, the noop plug-in 704 can register (e.g., by way of registration 706) itself as authoritative over the root level of the virtual file system 602. For instance, the noop plug-in 704 can be branched at the "\" directory, and its role can be to simply forward operations such as reads and writes to the storage backend 702. Thus, standard behavior for file access in the absence of authority exerted by another plug-in 704 can match tradition behavior of the underlying protocol of the interface (e.g., MMC, etc.).

In accordance with one aspect of the claimed subject matter, the root or noop plug-in 704 can also perform compression on the fly in order to save physical storage space on the data store 106. For example, the noop plug-in can be equipped with a configurable flag to determine whether data is forwarded directly to the storage backend 702, or whether the data should be compressed beforehand. It is to be appreciated that the compression can be handled by the noop plug-in 704 itself or the noop plug-in 704 can automatically call a distinct compression plug-in 704.

For the sake of further understanding, consider the VMCC 110 with the virtual file system 602 extended by three plug-ins 704. The plug-ins 704 can be, for example, a noop plug-in 704 branched at the root of the virtual file system 602 (e.g., "\"); a drm plug-in 704 branched under a "\drm" directory; and a random plug-in 704 branched under the "random" file of the "special" directory (e.g., "\special\random"). In accordance therewith, it is readily apparent that any access to the data store 106 that does not invoke the drm or random plug-ins 704 can be handled by default by the noop plug-in 704. As one example, a read or write operation to the path "\music\song.mp3" could result in an associated read or write to the data store 106 routed through the storage backend 702 and handled by the noop plug-in 704.

However, a read operation to "\special\random" could bypass the noop plug-in 704 since the VMCC 110 would instantiate the random plug-in 704 and transfer the data associated with the read operation to this plug-in 704. Thus, the random plug-in 704 can perform its designated processing, which is in this case to supply random data. It is to be appreciated that the "\special" directory (as distinguished from the file at "\special\random") can be either a real directory to be handled, e.g., by the noop plug-in 704, or a special directory automatically created by the VMCC 110 at the time of registration 706 of the random plug-in 704.

Lastly, a read operation to "\drm\music\song.mp3" can be forwarded to the drm plug-in 704 and can, e.g., result in the drm plug-in 704 accessing the "\music\song.mp3" file in the data store 106. In addition, the drm plug-in 704 might also be required to check privileges and/or decrypt the "\music\song.mp3" file prior to sending a reply to the device that originated the access (e.g., a host application). It should be appreciated that the drm plug-in 704 (as well as various other plug-ins 704) can be responsible not only for registering the file structures for which it has authority (and therefore should be invoked upon an access to those associated structures), but also for populating its own virtual directory with virtual files. In that vein, the various plug-ins 704 can choose to mimic the hierarchy of all (or a subset) of the physical files on the data store 106. Additionally or alternatively, the various plug-ins 704 can manage their own private storage areas (not shown) that can be similar to or a part of the VMCC storage area 306 and typically not accessible by way of the noop plug-in 704.

Figure 8:
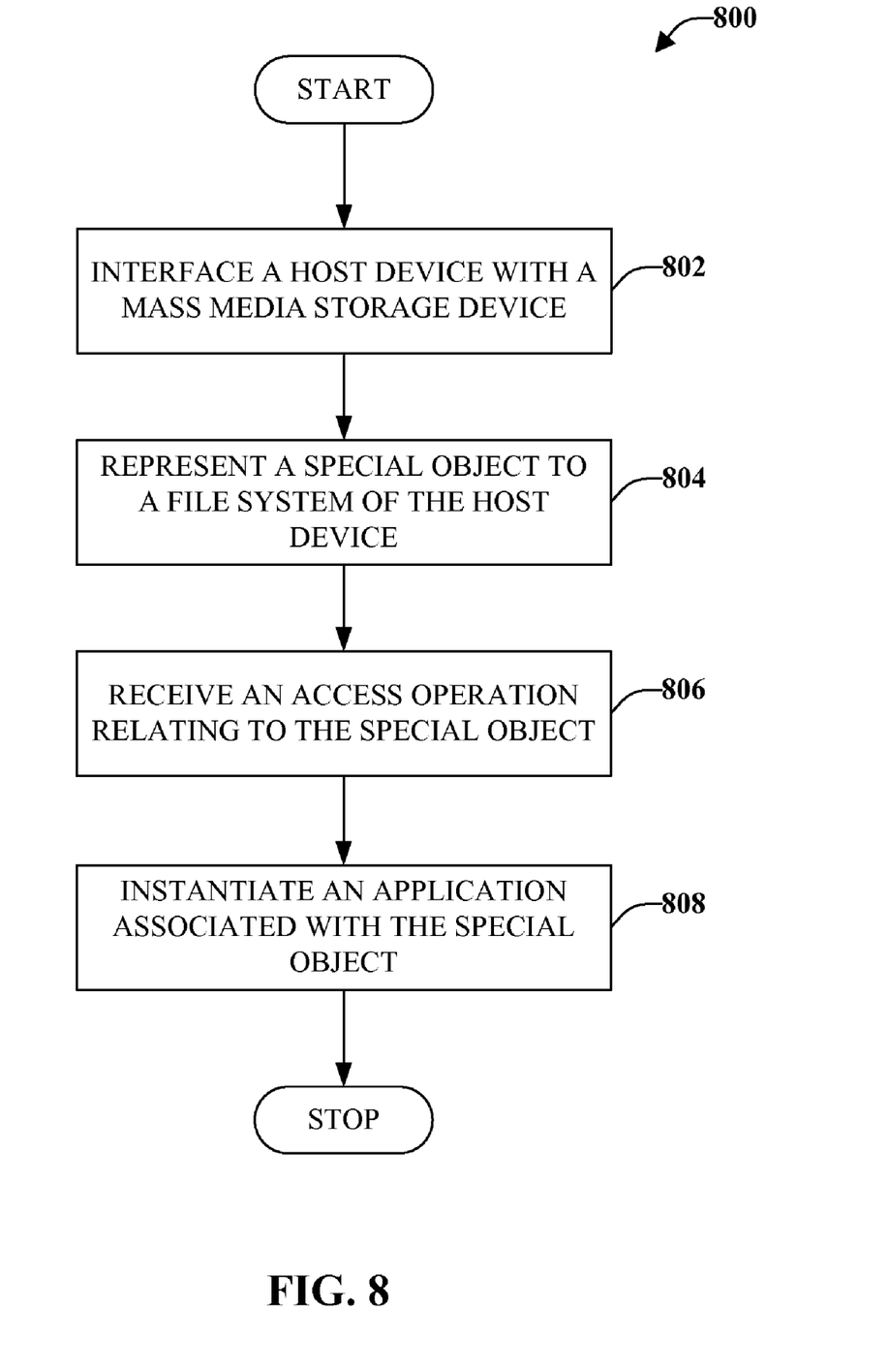
FIG. 8 illustrates an exemplary computer-implemented method for facilitating more robust interactions between a host device and a mass media storage device.

FIG. 8 illustrates a process flow diagram 800. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 8, an exemplary computer-implemented method 800 for facilitating more robust interactions between a host device and a mass media storage device is illustrated. At reference numeral 802, a host device can be interfaced with a mass media storage device. The host device can be substantially any type of consumer electronic device or other type of communication device, as well as an application running thereon including but not limited to a PDA, a digital camera, a digital recorder, an MP3 player, a pager, a PC, a laptop, etc. The mass media storage device should conform to the interfacing standard (e.g., USB, SD, MMC, or the like) and can be, for instance, smartcard with a CPU, file system, operating system, and ISO interface. Further, the mass media storage device can be substantially any other type of card, chip or disk that typically relies upon a file system of the host device for accesses to the drive originating from the host device.

At reference numeral 804, a special object can be represented to the host file system. The special object can be a special file, a special directory, a special partition, a special file system, or the like. The special object represented to the host file system may be physically stored on a data store of the mass media storage device or it may be a virtual object that has no direct physical counterpart extant on the data store. Rather, this virtual object can be addressable to the host device as part of a logical extension of the physical data store.

At reference numeral 806, an access operation can relating to the special object can be received. The access operation can be a standard access command in accordance with the protocol specifications of the interface such as a read access operation or a write access operation. For example, if the special object is a file, then a read access operation indicates to the mass media storage device that the host device is intending to read data from the special file. If the special object is a special directory (or special partition, etc.), then it is known that the host device is intending to read a file (or other blocks of data) that hierarchically exist within that special directory (or special partition, etc.).

Accordingly, at reference numeral 808, an application or plug-in associated with the special object can be instantiated or called to run on the CPU of the mass media storage device based upon at least one of the type of access operation (e.g., read/write) or the type of special object (e.g., file, directory . . . ). Typically, the application will be instantiated by a VMCC that is also running on the CPU and can manage access to the data store. The particular application instantiated can be determined based upon a table lookup or based upon a registration. For example, the registration can indicate that a particular plug-in is authoritative over a particular special object.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that transparently employs standard read or write operations at a sector level to facilitate interactions between a host and a mass storage block device, comprising:
   an interface to a host;
   a data store addressable at a sector level; and
   a virtual controller component that controls access to the data store and is configured to advertise a special object to a file system employed by the host to facilitate a bi-directional communication socket, wherein the socket is employed to transfer a command that is encapsulated within the socket and transmitted along the interface.

2. The system of claim 1, the virtual controller component is configured to receive an operation associated with the special object and to determine an application to call.

3. The system of claim 2, the virtual controller component determines the application to call based upon at least one of a type of the operation or a type of the special object.

4. The system of claim 2, the operation is a sector level read operation or a sector level write operation.

5. The system of claim 1, the special object is at least one of a special file, a special directory, a special partition, a special file system, or a virtual object.

6. The system of claim 1, the special object is a special file physically extant in the data store.

7. The system of claim 6, the special file has a file size equal to one sector of the file system.

8. The system of claim 6, the special file is created as the data store is formatted.

9. The system of claim 6, the virtual controller component records a logical sector number corresponding to a physical location of the special file.

10. The system of claim 9, the virtual controller component updates the logical sector number when the physical location of the special file is changed.

11. The system of claim 6, the special file is flagged as an unmovable to the file system.

12. The system of claim 6, the special file is created in a special directory.

13. The system of claim 12, the virtual controller component, upon initialization, scans the special directory and records a physical location of the special file.

14. The system of claim 6, the special file is created after initialization and the virtual controller component records a logical sector number corresponding to a physical location of the special file.

15. The system of claim 14, the special file is created as a result of an operation transmitted by the host.

16. The system of claim 1, the special object is a virtual object not extant in the data store.

17. The system of claim 16, the virtual object is dynamically created.

18. The system of claim 16, the virtual object is addressable to the file system as a logical extension of the data store, the logical extension begins at logical sector N, where N is a number of physical sectors in the data store.

19. The system of claim 1, the virtual component comprising:
   a file system client that reads data from or writes data to the data store;
   a virtual file system that includes a directory registered to a plug-in; and
   a file system server that serves the virtual file system to the host.

20. The system of claim 19, the virtual controller component advertises a virtual file system to the host.

21. The system of claim 19, the virtual controller component employs a table to map a sector level operation to a logical path in the virtual file system.

22. The system of claim 21, the virtual controller component is configured to call the plug-in registered to the directory in the logical path with a request for at least one of a directory, a file, or an offset of the file that corresponds to a subpath of the directory.

23. The system of claim 22, the virtual controller component queries the plug-in to determine the special objects over which the plug-in is registered.

24. The system of claim 21, the virtual controller component maintains a special storage block in the data store that is not visible to the host.

25. The system of claim 21, the virtual controller component stores the table in the special storage block.

26. The system of claim 19, the directory is a root directory of the virtual file system and the plug-in is a noop plug-in that forwards an operation received from the host to the data store.

27. The system of claim 19, the plug-in is at least one of a Digital Rights Management (DRM) plug-in, a random plug-in, an encryption plug-in, a multiplexer plug-in, a compression plug-in, or a special plug-in.

28. The system of claim 1, the socket is at least one of an input socket or an output socket, the socket is employed to transfer a command.

29. The system of claim 28, the command is comprised of a device number, a socket number and a payload.

30. The system of claim 28, the ISO command relates to an Application Protocol Data Unit (APDU) command, where APDU is defined by ISO 7816.

31. The system of claim 28, the command is an extension of the ISO command.

32. The system of claim 28, further comprising a file system client included in the VMCC.

33. The system of claim 32, the VMCC pre-processes data received from the input socket prior to writing to the data to the store.

34. The system of claim 32, the VMCC post-processes data received from the data store prior to transmitting the data to the output socket.

35. The system of claim 1, further comprising a mass storage device controller.

36. The system of claim 35, the virtual controller component is a hardware circuit operatively coupled to a mass storage device controller.

37. The system of claim 35, the virtual controller component is a software application that runs on a mass storage device controller.

38. The system of claim 1, the data store is configured as a block device.

39. The system of claim 1, the data store is comprised of flash memory.

40. The system of claim 1, the interface is compliant with at least one of MultiMediaCard (MMC), Secure Digital (SD), or Universal Serial Bus (USB) standards.

41. A computer-implemented method for facilitating interactions between a host and a mass media storage device, comprising:
  interfacing a host device with a mass media data storage device;
  representing a special object to a file system of the host device;
  receiving an access operation relating to the special object; and
  instantiating an application associated with the special object based at least in part upon a type of the access operation, wherein the application opens at least one of an input socket or an output socket, the socket is employed to transfer a command that is encapsulated within the socket and transmitted along the interface.

* * * * *